US011333628B2

(12) United States Patent
Astarita et al.

(10) Patent No.: US 11,333,628 B2
(45) Date of Patent: May 17, 2022

(54) CHEMICAL CLASS COMPOSITIONS FROM COLLISION CROSS-SECTION FRAGMENT IONS

(71) Applicant: Waters Technologies Corporation, Milford, MA (US)

(72) Inventors: Giuseppe Astarita, Hopkinton, MA (US); Scott Geromanos, Middletown, NJ (US)

(73) Assignee: Waters Technologies Corporation, Milford, MA (US)

( * ) Notice: Subject to any disclaimer, the term of this patent is extended or adjusted under 35 U.S.C. 154(b) by 0 days.

(21) Appl. No.: 16/309,767

(22) PCT Filed: Jun. 30, 2017

(86) PCT No.: PCT/US2017/040256
§ 371 (c)(1),
(2) Date: Dec. 13, 2018

(87) PCT Pub. No.: WO2018/005948
PCT Pub. Date: Jan. 4, 2018

(65) Prior Publication Data
US 2019/0317047 A1    Oct. 17, 2019

Related U.S. Application Data

(60) Provisional application No. 62/356,636, filed on Jun. 30, 2016.

(51) Int. Cl.
*H01J 49/00* (2006.01)
*G01N 27/622* (2021.01)

(52) U.S. Cl.
CPC .......... *G01N 27/622* (2013.01); *H01J 49/005* (2013.01); *H01J 49/0027* (2013.01)

(58) Field of Classification Search
CPC . G01N 27/622; G01N 27/624; H01J 49/0045; H01J 49/005; H01J 49/0054; H01J 49/0059; H01J 49/0068; H01J 49/0072
See application file for complete search history.

(56) References Cited

U.S. PATENT DOCUMENTS

2004/0197826 A1* 10/2004 Suckau .............. G01N 33/6848
435/7.1
2005/0065733 A1*  3/2005 Caron .................... G16H 70/40
702/19

(Continued)

FOREIGN PATENT DOCUMENTS

WO       2011128703 A1    10/2011
WO       2015136264 A1     9/2015

OTHER PUBLICATIONS

Tarentino, Anthony L., Caroline M. Gomez, and Thomas H. Plummer Jr. "Deglycosylation of asparagine-linked glycans by peptide: N-glycosidase F." Biochemistry 24.17 (1985): 4665-4671 (Year: 1985).*

(Continued)

*Primary Examiner* — Wyatt A Stoffa
(74) *Attorney, Agent, or Firm* — Womble Bond Dickinson (US) LLP; Deborah M. Vernon

(57) ABSTRACT

The present disclosure generally relates to methods for determining chemical class compositions present in a sample using collision cross-section fragment ion values.

15 Claims, 9 Drawing Sheets

(56) References Cited

U.S. PATENT DOCUMENTS

| | | | | |
|---|---|---|---|---|
| 2007/0158543 | A1* | 7/2007 | Clowers | H01J 49/02 250/282 |
| 2010/0248388 | A1* | 9/2010 | Liu | H01J 49/0418 436/173 |
| 2010/0311176 | A1* | 12/2010 | Williamson | G01N 33/6848 436/86 |
| 2011/0198493 | A1* | 8/2011 | Clemmer | G01N 27/622 250/282 |
| 2018/0143169 | A1* | 5/2018 | Astarita | G01N 33/50 |
| 2018/0246062 | A1* | 8/2018 | Hofmann | G01N 33/6848 |
| 2019/0154632 | A1* | 5/2019 | Harder | H01J 49/004 |

OTHER PUBLICATIONS

Gaye, M. M., R. Kurulugama, and D. E. Clemmer. "Investigating carbohydrate isomers by IMS-CID-IMS-MS: precursor and fragment ion cross-sections." Analyst 140.20 (2015): 6922-6932 (Year: 2015).*

Fenn, Larissa S., and John A. McLean. "Structural resolution of carbohydrate positional and structural isomers based on gas-phase ion mobility-mass spectrometry." Physical Chemistry Chemical Physics 13.6 (2011): (Year: 2011).* https://en.wikipedia.org/wiki/Fragmentation_(mass_spectrometry), retrieved May 5, 2020 (Year: 2020).*

Fenn, Larissa S., et al. "Characterizing ion mobility-mass spectrometry conformation space for the analysis of complex biological samples." Analytical and bioanalytical chemistry 394.1 (2009): 235-244. (Year: 2009).*

May, Jody C., et al. "Conformational ordering of biomolecules in the gas phase: nitrogen collision cross sections measured on a prototype high resolution drift tube ion mobility-mass spectrometer." Analytical chemistry 86.4 (2014): 2107-2116 (Year: 2014).*

Paglia et al. "Ion Mobility-Derived Collision Cross Section As an Additional Measure for Lipid Fingerprinting and dentification" Analytical Chemistry, vol. 87 Issue 2 (Dec. 13, 2014): pp. 1137-1144; abstract, p. 1138 col. 1 para 5, p. 1138 col. 1 para 6, p. 1138 col. 2 para 2, p. 1140 col. 1 para 2, p. 1142 col. 1 para 2.

Hilton et al. "Structural Analysis of Synthetic Polymer Mixtures Using Ion Mobility and Tandem Mass Spectrometry" Analytical Chemistry, vol. 80 Issue 24 (Nov. 19, 2008): pp. 9720-9725; entire document.

Dong et al. "Collision Cross-Section Determination and Tandem Mass Spectrometric Analysis of Isomeric Carotenoids Using Electrospray Ion Mobility Time-of-Flight Mass Spectrometry" Analytical Chemistry, vol. 82 Issue 21 (Oct. 7, 2010): pp. 9014-9021; entire document.

Paglia et al. "Ion Mobility Derived Collision Cross Sections to Support Metabolomics Applications" Analytical Chemistry, vol. 86 Issue 8 (Mar. 18, 2014): pp. 3985-3993; entire document.

Riba-Garcia et al. "Evidence for Structural Variants of a- and b-Type Peptide Fragment Ions Using Combined Ion Mobility/Mass Spectrometry" Journal of the American Society of Mass Spectrometry, vol. 19 Issue 4 (Jan. 31, 2008) pp. 609-613; entire document.

International Search Report and the Written Opinion issued in corresponding International Application No. PCT/US2017/040256; completed on Aug. 31, 2017; dated Sep. 28, 2017.

Paglia et al. "Applications of ion-mobility mass spectrometry for lipod analysis" Analytical and Bioanalytical Chemistry, vol. 407 Issue 17 (Jul. 2015): pp. 4995-5007; entire document.

Cuyckens et al. "Product ion mobility as a promising tool for assignment of positional isomers of drug metabolites." Rapid Commun. Mass Spectrom. 25(2011): 3497-3503.

Extended European Search Report issued in European Application No. 17821345.0 dated Jan. 27, 2020.

Hofmann et al. "Estimating Collision Cross Sections of Negatively Charged N-Glycans using Traveling Wave Ion Mobility-Mass Spectrometry." Anal. Chem. 86.21(2014): 10789-10795.

Struwe et al. "GlycoMob: an ion mobility-mass spectrometry collision cross section database for glycomics." Glycoconj. J. (2015). 6 pages.

* cited by examiner

US 11,333,628 B2

CHEMICAL CLASS COMPOSITIONS FROM COLLISION CROSS-SECTION FRAGMENT IONS

CROSS-REFERENCE TO RELATED APPLICATIONS

This application is a National Stage Application of International Application No. PCT/US2017/040256, filed Jun. 30, 2017, which claims priority to U.S. Provisional Application No. 62/356,636, filed Jun. 30, 2016, and entitled "Chemical Class Compositions From Collision Cross-Section Fragment Ions". Each of the foregoing applications is incorporated herein by reference in its entirety.

TECHNICAL FIELD

The present disclosure generally relates to determining chemical class compositions present in a sample using collision cross-section fragment ion values.

BACKGROUND

The structural elucidation of compounds in complex samples (e.g., biofluids, tissues from plants and animals, foods, etc.) remains a significant analytical challenge. For example, while metabolomics aims to comprehensively profile low-molecular weight compounds, current estimates are in the range of 10,000 metabolites in a typical biological sample. Also, most of the metabolites in any given sample are largely unknown. Manual mass spectra data interpretation is often required. However, knowledge of the expected fragmentation patterns for many scaffolds is limited, thus further complicating analysis. Yet, the need still remains to rapidly identify coregulated chemical classes for drug discovery and development, metabolomics, lipidomics, and biomarker discovery.

SUMMARY

The present disclosure provides high-throughput and robust methods of using information obtained from collision cross-section (CCS) of fragment ions to determine the chemical class composition of a sample.

Also provided are methods for calculating composite values of precursor and product ions to increase measurement selectivity.

In one aspect, the provided methods can be used as an alternative to, or in combination with other analytical methods to identify and analyze a large number of chemical classes from multiple fragmentation spectra of a complex sample.

DETAILED DESCRIPTION OF CERTAIN EMBODIMENTS

Figure 1:
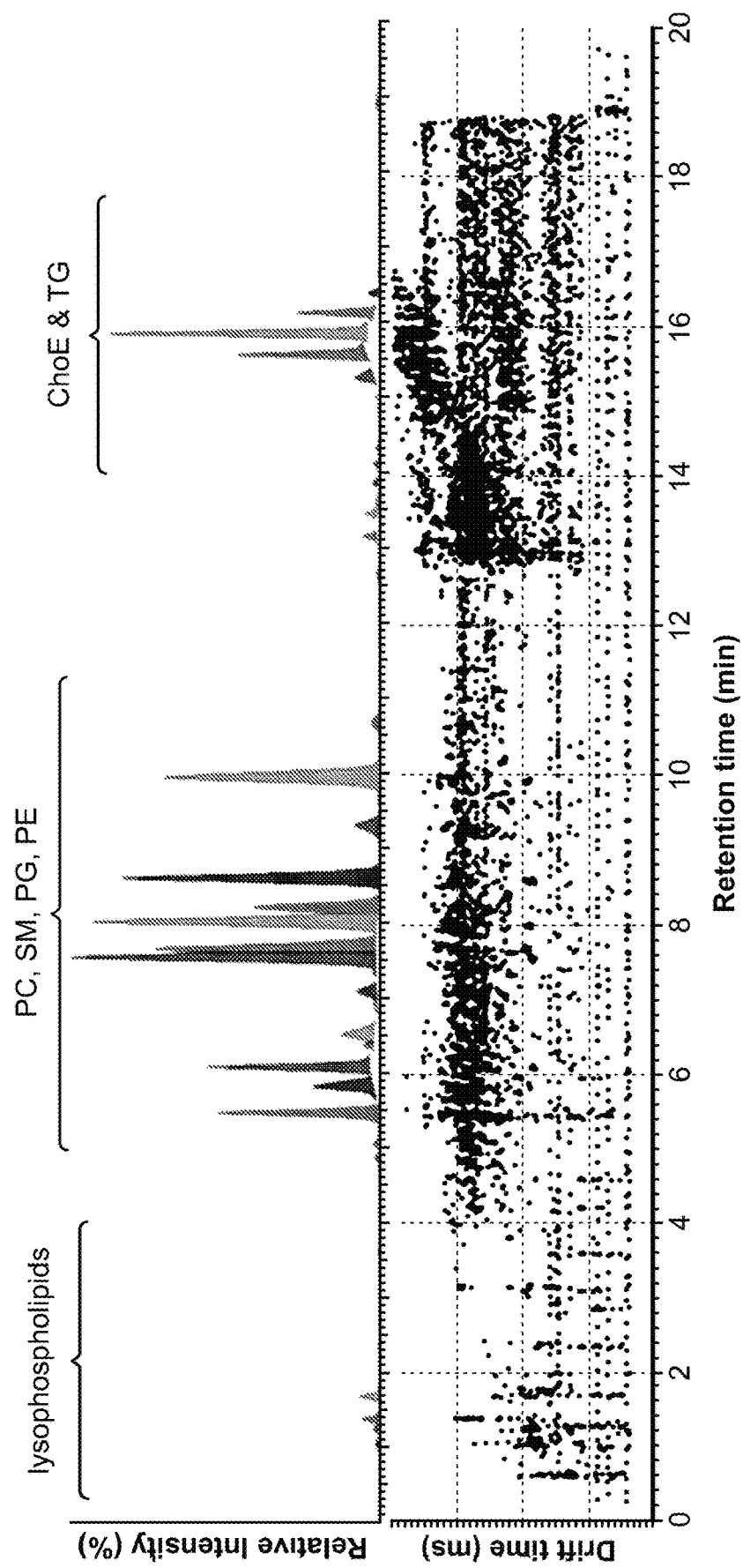
FIG. 1 depicts a chromatogram of liquid chromatography-ion mobility mass spectrometry (MS) analysis of brain extracts.

In one embodiment, provided are methods of using information obtained from collision-cross section (CCS) of fragment ion values to determine at least one chemical class composition of a sample, the method comprising: a) fragmenting the sample to generate a series of product and precursor ions; separating the product ions using ion-mobility; b) obtaining CCS values of the product ions; and c) matching or correlating the CCS values of the product ions to pre-determined values.

In one aspect, the experimentally derived ion properties obtained during steps a) and b), such as the m/z ratio, intensity distribution, elution position, and charge of the parent ions as well as the m/z ratio, intensity distribution, elution position, charge, and CCS of the precursor ions, may be used in connection with the CCS values of the product ions to determine at least one chemical class composition of a sample. Thus, in one aspect, the methods herein further comprise obtaining at least one ion property selected from m/z ratio, elution position, intensity distribution, charge, and CCS value of the precursor ions; obtaining at least one ion property selected from m/z ratio, elution position, intensity distribution, and charge of the product ions; correlating the at least one ion property of the precursor ions with the corresponding at least one ion property of the parent ions; and matching or correlating the at least one ion property of both the precursor and parent ions to pre-determined values. of the product ions to pre-determined values.

"Chemical class" or "chemical class composition" refers to the general class to which compounds are grouped based upon their relative structure or function. These classes are readily apparent to one of skill in the art and include, but are not limited to, lipids (e.g., fatty acids, glycerolipids, glycerophospholipids, sphingolipids, sterol lipids, prenol lipids, saccharolipids, and polyketides), polyols (e.g., sugar alcohol), polyethers (e.g., paraformaldehyde, polyethylene glycol, polypropylene glycol, and polytetramethylene glycol), polyesters (e.g., polyethylene terephthalate), vitamins (e.g., Vitamin A, Vitamin B1, Vitamin B2, Vitamin B3, Vitamin B5, Vitamin B6, Vitamin B7, Vitamin 9, Vitamin 12, Vitamin C, Vitamin D, Vitamin E, and Vitamin K), antioxidants (e.g., uric acid, glutathione, and melatonin), amino acids (e.g., natural and non-natural amino acids), nucleotides (e.g., purine and pyrimidine nucleotides), hormones (e.g., eicosanoids, steroids, amines, peptides, and proteins), and carbohydrates (e.g., sugars, starch, cellulose, monosaccharides, disaccharides, oligosaccharides, and polysaccharides. The methods described herein are useful in identifying the chemical class or chemical classes present in a sample. It should be understood that the present methods are not limited to only identifying the chemical class composition of a sample, but are also useful to identify the individual compounds falling within the chemical class. For example, in one aspect, the present methods are useful in identifying a chemical class composition (e.g., a lipid). In another aspect, the present methods are useful in identifying the type of lipid present in the sample (e.g., phosphatidylethanolamine such as vinyl ether and acyl versions). It should also be understood that the samples in the present method may contain numerous chemical classes. Thus, the sample herein can comprise two or more chemical class such as e.g., any one of the chemical classes mentioned above.

The present disclosure includes methods for calculating the collision cross section (CCS) of fragment ions. As used herein, collision cross section (CCS) represents the effective area for the interaction between an individual ion and the neutral gas through which it travels. CCS, is a physicochemical property, and is related to chemical structure and three-dimensional conformation. If certain instances, the experimental CCS of each detected lipid ion can be searched against CCS databases, where available (i.e., compared with a standard or pre-determined value). Methods for calculating CCS can be found in e.g., Paglia et al., Ion Mobility-Derived Collision Cross Section As an Additional Measure for Lipid Fingerprinting and Identification; Anal Chem. 2015 Jan. 20; 87(2):1137-44; doi: 10.1021/ac503715v and Paglia et al. Ion Mobility Derived Collision Cross Sections to Support Metabolomics Applications; Anal Chem; 2014 Apr. 15; 86(8):3985-93; doi: 10.1021/ac500405x. Epub 2014 Mar. 28.

The present disclosure also includes methods of separating components based on charge state using ion mobility. Ion mobility is a gas-phase electrophoretic technique that enables the separation of gas-phase lipid ions within a chamber pressurized with a buffer gas (e.g., nitrogen). The time required for lipid ions to cross the ion-mobility separation cell—the drift time-depends on the collision frequency between the ions and the buffer gas. Thus, drift times are directly related to the shape, size, and charge of the desired ions as well as to the nature of the buffer gas. Methods of performing ion mobility can be found in e.g., Paglia et al., Ion Mobility-Derived Collision Cross Section As an Additional Measure for Lipid Fingerprinting and Identification; Anal Chem. 2015 Jan. 20; 87(2):1137-44; doi: 10.1021/ac503715v and Paglia et al. Ion Mobility Derived Collision Cross Sections to Support Metabolomics Applications; Anal Chem; 2014 Apr. 15; 86(8):3985-93; doi: 10.1021/ac500405x. Epub 2014 Mar. 28.

In one embodiment, the ion mobility comprises the step of performing drift-tube ion mobility spectrometry, travelling-wave ion mobility spectrometry, or differential mobility spectrometry.

In one embodiment, the ion mobility-mass spectrometry is operated in a data independent acquisition mode or data-dependent acquisition, or a combination thereof, wherein CCS of the precursor ions are associated with CCS of product ions in the sample.

In one embodiment, the ion mobility-mass spectrometry is operated in a data independent acquisition mode or data-dependent acquisition, or a combination thereof, wherein CCS of the precursor ions are associated with CCS of product ions in the sample; and the method further comprises separating the precursor ions by ion mobility spectrometry, fragmenting the precursor ions, and obtaining the values of the precursor ions; and calculating a hash mass comprising a composite value consisting of the precursor ion value m/z multiplied by the precursor ion collision cross-section area squared ($CCSA^2$) multiplied by the product ion m/z multiplied by the product ion $CCSA^2$ to determine the association between CCS precursor ions and CCS product ions in the sample.

In one embodiment, fragmentation of the sample is performed in source.

Fragmentation of the sample can be induced by means common to one of skill in the art. Such methods include e.g., tandem mass spectrometry (MS/MS), including collision induced dissociation (CID), electron transfer dissociation (ETD), electron impact, ultraviolet photoionization, ozonolysis, or similar fragmentation tools.

In one embodiment, the ionization method used in the present methods is selected from electrospray ionization (ESI), matrix assisted laser desorption ionization (MALDI) or ambient ionization tools, including laser ablation electrospray ionization (LAESI), desorption electrospray ionization (DESI), and rapid evaporative ionization mass spectrometry (REIMS).

In one embodiment, the methods herein further comprise separating the chemical classes prior to the separation of ions. Alternatively, the methods herein further comprise separating the chemical classes using chromatography prior to the separation of ions. In another alternative, the methods herein further comprise separating the chemical classes prior to the separation of ions using ion mobility. Such methods include e.g., liquid chromatography, supercritical fluid chromatography or gas chromatography.

The samples analyzed by the present methods include sample which are capable of being ionized. In one aspect, the sample is a complex sample, meaning the sample contains multiple components (e.g., one or more compounds). Typically, the sample is biological in nature. In one aspect, the sample herein are biofluids, tissues, sections, or cell cultures.

The present methods can also be used as means for determining cross-section fragment ion values of a sample and then storing or using those values as a standard for future reference. Thus, in one aspect, the present methods provide the use of drift-time ion mobility spectrometry, travelling-wave ion mobility spectrometry, or differential mobility spectrometry for determining cross-section fragment ion values of a sample, the method comprising: fragmenting the sample to generate a series of product ions; separating the product ions using ion-mobility; obtaining collision cross-section values; and collecting the collision cross-section values.

The subject technology is further illustrated by the following examples which should not be construed as limiting. The contents of all references, patents and published patent applications cited throughout this application, are incorporated herein by reference.

EXEMPLIFICATION

Ion Mobility MS Analysis of Brain Extracts

FIG. 1 shows an analysis of brain extracts using ion mobility mass spectrometry (MS) based on the present methods. The sample (i.e., brain extract) was analyzed using an UHPLC coupled with Synapt-G2Si HDMS in data independent acquisition mode as previously reported. See Paglia et al., Ion Mobility-Derived Collision Cross Section As an Additional Measure for Lipid Fingerprinting and Identification; Anal Chem. 2015 Jan. 20; 87(2):1137-44; doi: 10.1021/ac503715v and Paglia et al. Ion Mobility Derived Collision Cross Sections to Support Metabolomics Applications; Anal Chem; 2014 Apr. 15; 86(8):3985-93; doi: 10.1021/ac500405x. Epub 2014 Mar. 28. Alternating high and low energy in the collision cell located before the ion mobility separation cell allowed us to acquire information CCS for both precursors and fragments ions.

Figure 2:
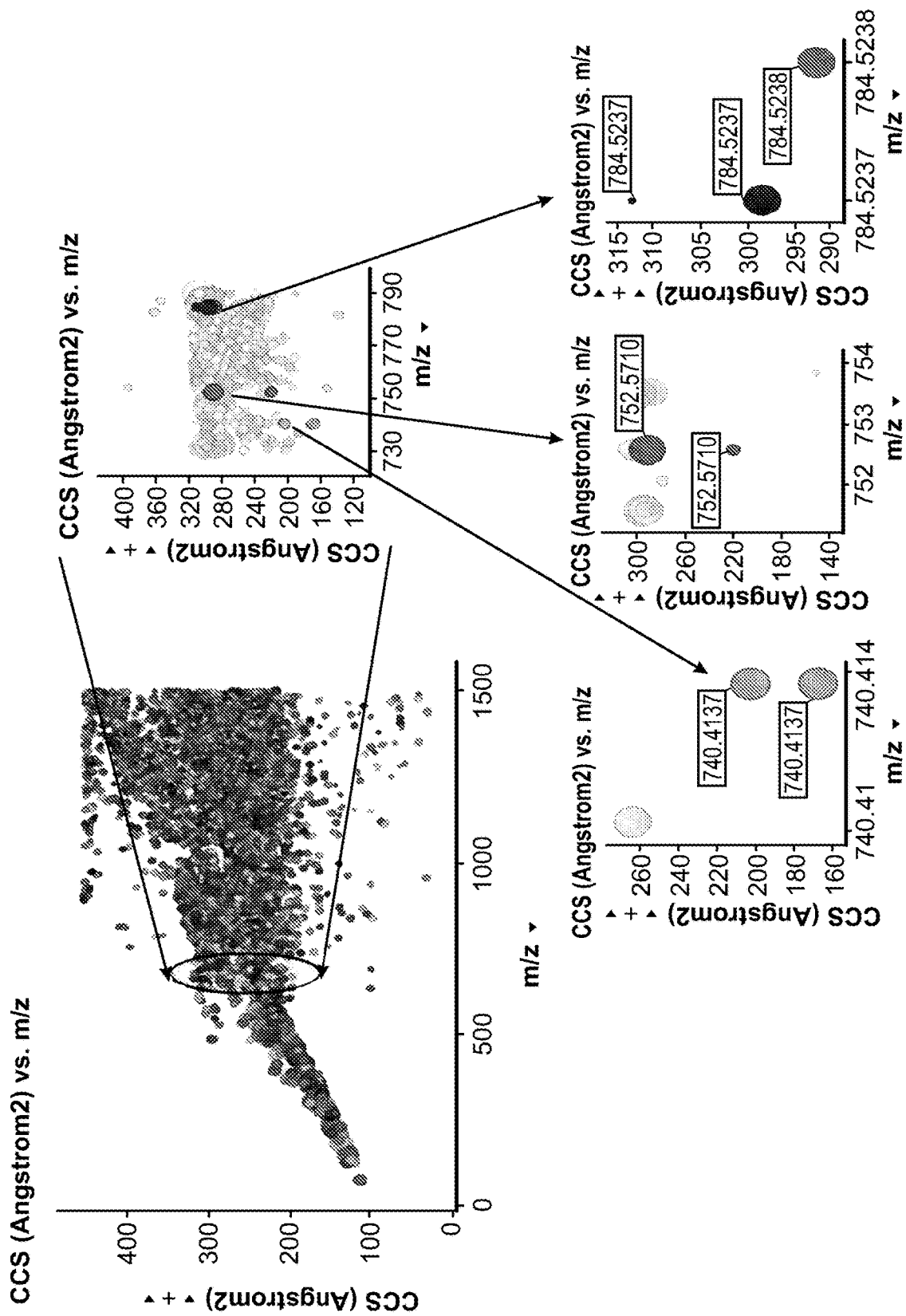
FIG. 2 illustrates the direct analysis (infusion) of human brain extracts using an ion mobility MS instrument.

FIG. 2 shows a direct analysis (infusion) of human brain extracts using the present methods. Precursor and fragment ions can be separated using CCS versus m/z plots. Similar fragments cluster together in the CCS-m/z space providing information on their chemical structure.

Figure 3:
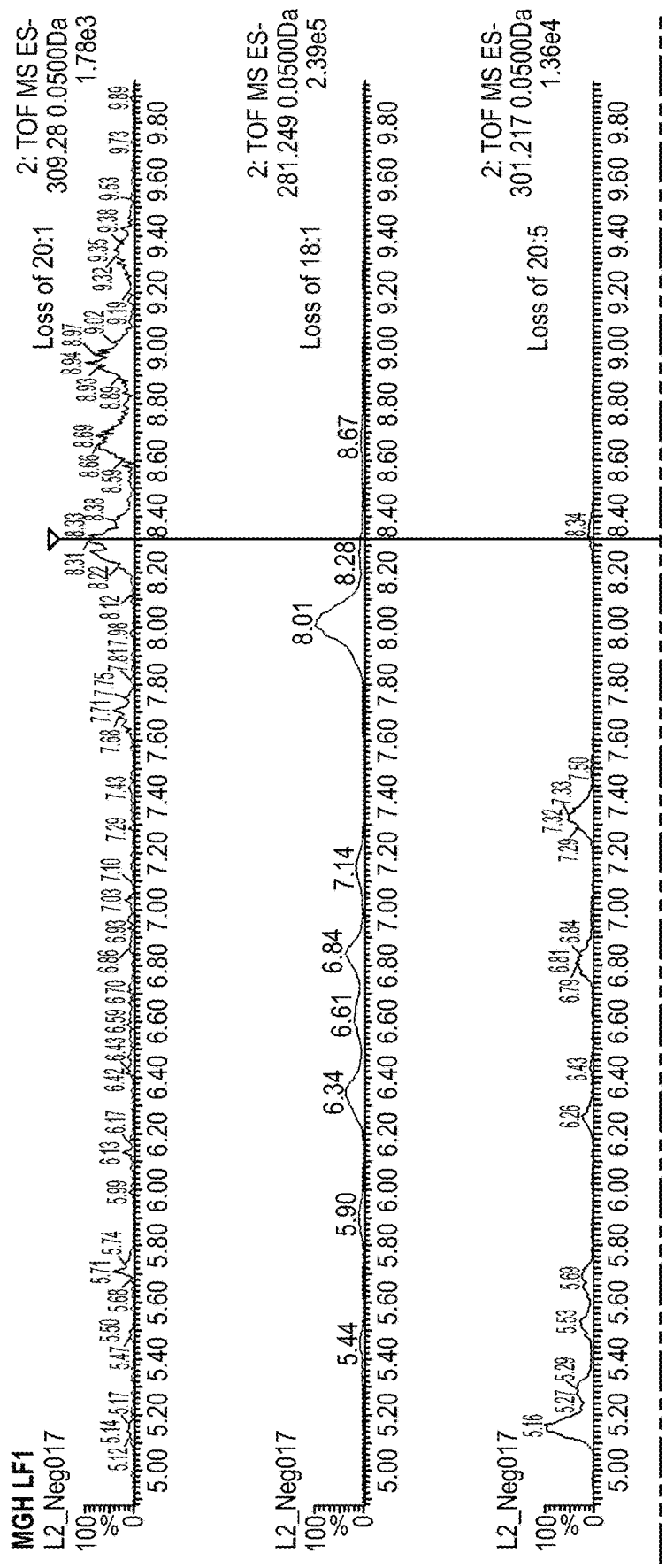
FIG. 3 depicts extracted ion chromatograms for fatty acyl groups obtained after data independent fragmentation of complex lipid extracts analyzed using an Ultra High-Performance Liquid Chromatography method described herein.
Figure 3:
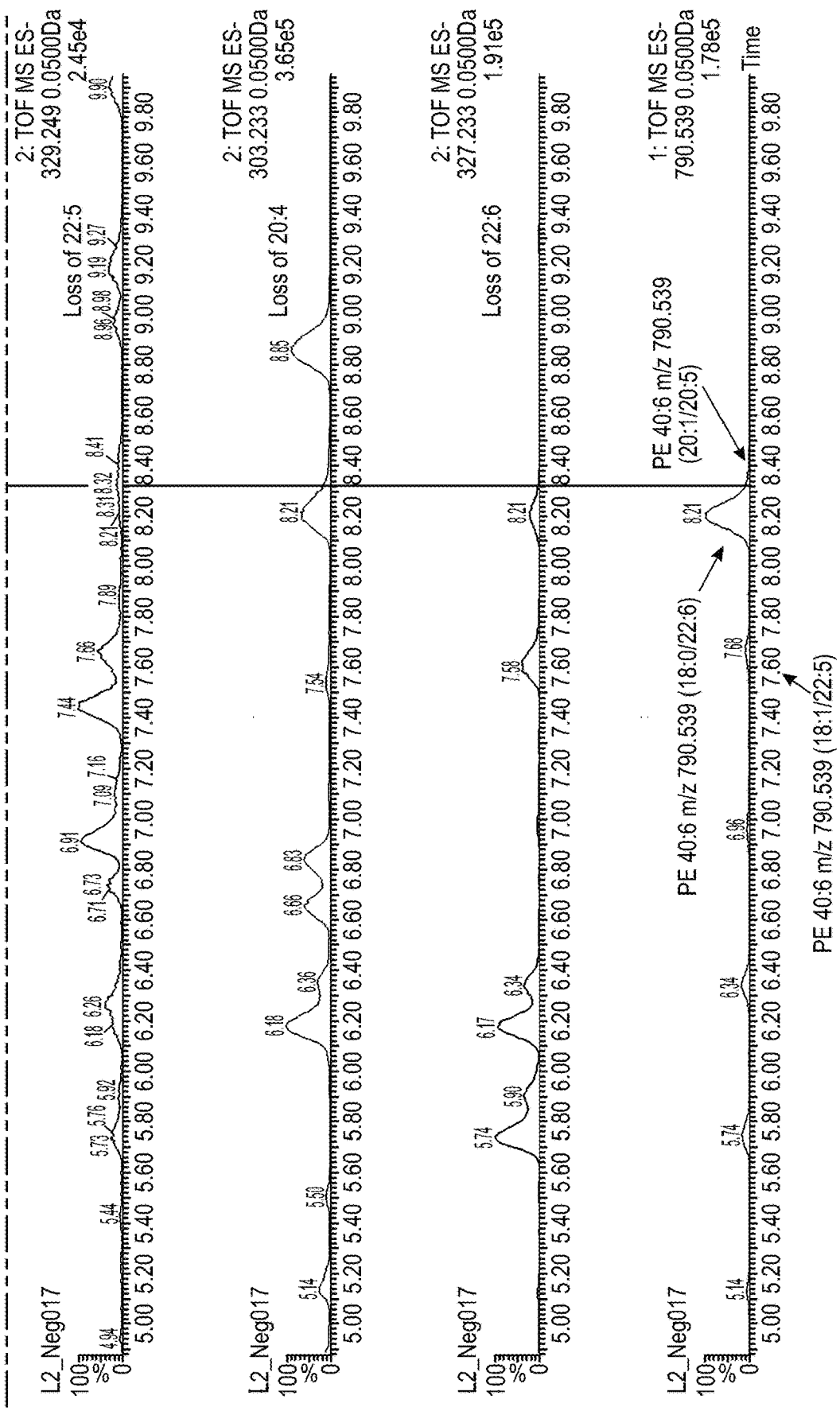

As shown in FIG. 3 fragment information can be either extracted using CCS or mass values, or a combination of the above. Typical brain phosphatidylethanolamine (PE) species are fragmented before ion mobility separation. In negative ionization mode, PEs loose fatty acyl units, whose CCS values can be used for identification. CCS values for common lipid species (e.g., fatty acyl groups) are listed in Table 1.

TABLE 1

| Fragment | m/z | Ion | CCS |
|---|---|---|---|
| LPC 14:0 | 468.31 | [M + H]$^+$ | 227 |
| LPC 16:1 | 494.32 | [M + H]$^+$ | 229 |
| LPC 16:0 | 496.34 | [M + H]$^+$ | 236 |
| LPC 18:1 | 522.36 | [M + H]$^+$ | 240 |
| LPC 18:0 | 524.37 | [M + H]$^+$ | 246 |
| LPC 20:4 | 544.34 | [M + H]$^+$ | 242 |
| LPC 20:3 | 546.36 | [M + H]$^+$ | 249 |
| LPC 20:2 | 548.37 | [M + H]$^+$ | 250 |
| Cholesterol | 369.35 | [M − H$_2$O + H]$^+$ | 205 |
| FA C16:0 | 255.23 | [M − H]$^-$ | 170 |
| FA C17:0 | 269.25 | [M − H]$^-$ | 174 |
| FA C18:0 | 283.26 | [M − H]$^-$ | 178 |
| FA C20:0 | 311.3 | [M − H]$^-$ | 187 |
| FA C22:0 | 339.33 | [M − H]$^-$ | 191 |
| FA C24:0 | 367.36 | [M − H]$^-$ | 200 |
| FA C18:1 | 281.25 | [M − H]$^-$ | 175 |
| FA C18:2 | 279.23 | [M − H]$^-$ | 172 |
| FA C18:3 | 277.22 | [M − H]$^-$ | 170 |
| FA C20:1 | 309.28 | [M − H]$^-$ | 183 |
| FA C22:1 | 337.31 | [M − H]$^-$ | 189 |
| FA C24:1 | 365.34 | [M − H]$^-$ | 195 |
| FA C20:3 | 305.25 | [M − H]$^-$ | 178 |
| FA C20:4 | 303.23 | [M − H]$^-$ | 182 |
| FA C20:5 | 301.22 | [M − H]$^-$ | 184 |
| FA C22:4 | 331.26 | [M − H]$^-$ | 188 |
| FA C22:5 | 329.25 | [M − H]$^-$ | 188 |
| FA C22:6 | 327.23 | [M − H]$^-$ | 187 |
| LPE 16:1 | 450.26 | [M − H]$^-$ | 210 |
| LPE 16:0 | 452.28 | [M − H]$^-$ | 212 |
| LPE 18:1 | 478.29 | [M − H]$^-$ | 217 |
| LPE 18:0 | 480.31 | [M − H]$^-$ | 219 |
| LPE 20:4 | 500.28 | [M − H]$^-$ | 219 |
| LPE 20:3 | 502.29 | [M − H]$^-$ | 220 |
| LPE 20:2 | 504.31 | [M − H]$^-$ | 222 |
| LPE 20:1 | 506.33 | [M − H]$^-$ | 224 |
| LPE 20:0 | 508.34 | [M − H]$^-$ | 225 |
| LPE 20:5 | 498.26 | [M − H]$^-$ | 219 |
| LPE 22:6 | 524.28 | [M − H]$^-$ | 223 |
| LPE 22:5 | 526.29 | [M − H]$^-$ | 224 |
| LPE 22:4 | 528.31 | [M − H]$^-$ | 225 |
| Cer d18:1/14:0 | 492.48 | [M − H$_2$O + H]$^+$ | 251 |
| Cer d18:1/16:0 | 520.51 | [M − H$_2$O + H]$^+$ | 258 |
| Cer d18:1/18:0 | 548.54 | [M − H$_2$O + H]$^+$ | 266 |
| Cer d18:1/20:0 | 576.57 | [M − H$_2$O + H]$^+$ | 273 |
| Cer d18:1/22:0 | 604.6 | [M − H$_2$O + H]$^+$ | 279 |
| Cer d18:1/24:1 | 630.62 | [M − H$_2$O + H]$^+$ | 285 |
| Cer d18:1/24:0 | 632.63 | [M − H$_2$O + H]$^+$ | 287 |
| Cer d18:1/26:1 | 658.65 | [M − H$_2$O + H]$^+$ | 29 |
| Cer d18:1/26:0 | 660.67 | [M − H$_2$O + H]$^+$ | 295 |
| Cer d18:0/16:0 | 540.54 | [M + H]$^+$ | 261 |
| Cer d18:0/18:0 | 568.57 | [M + H]$^+$ | 272 |
| Cer d18:0/20:0 | 596.6 | [M + H]$^+$ | 277 |
| Cer d18:0/22:0 | 624.63 | [M + H]$^+$ | 284 |
| Cer d18:0/24:0 | 652.66 | [M + H]$^+$ | 293 |

TABLE 1-continued

| Fragment | m/z | Ion | CCS |
|---|---|---|---|
| Cer d18:0/24:1 | 650.65 | [M + H]$^+$ | 291 |
| Cer d18:0/26:0 | 680.69 | [M + H]$^+$ | 299 |
| Cer d18:0/26:1 | 678.68 | [M + H]$^+$ | 297 |

Figure 4:
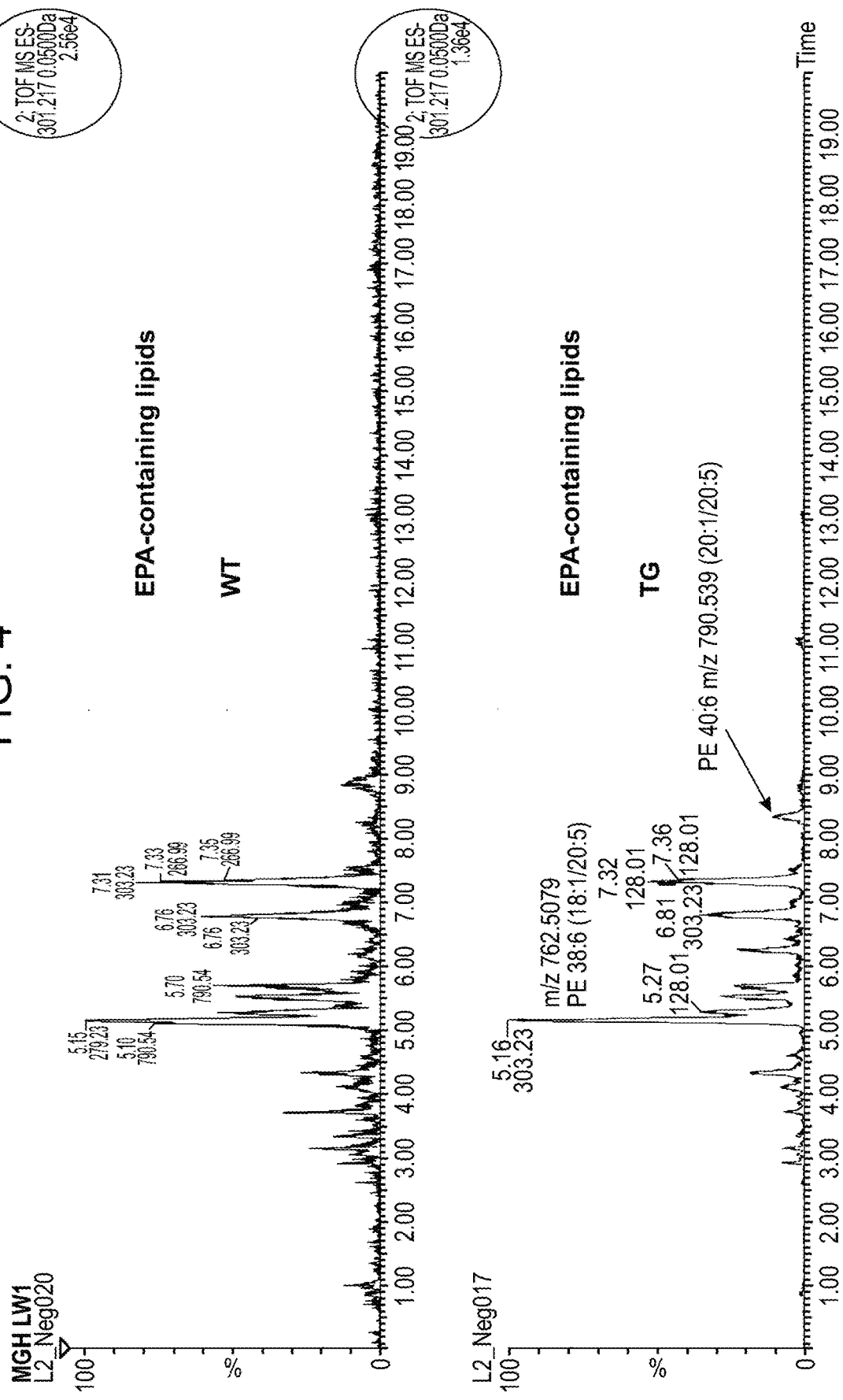
FIG. 4 depicts a comparison of wild type (WT) versus transgenic (TG) lipid extracted for the fatty acyl EPA after a UHPLC-ion mobility MS analysis described herein.

FIG. 4 shows a comparison of wild type (WT) versus transgenic (TG) lipid extracted for the specific CCS of the fatty acyl EPA after ion mobility MS analysis using a UHPLC instrument coupled with a Mass Spectrometer (Synapt-G2Si HDMS available from Waters Corporation, Milford Mass.) in data independent acquisition mode as previously reported. Briefly, fragment information for EPA can be either be extracted using CCS or mass values, or a combination of the above. CCS values for the EPA moiety is listed in Table 1.

Figure 5:
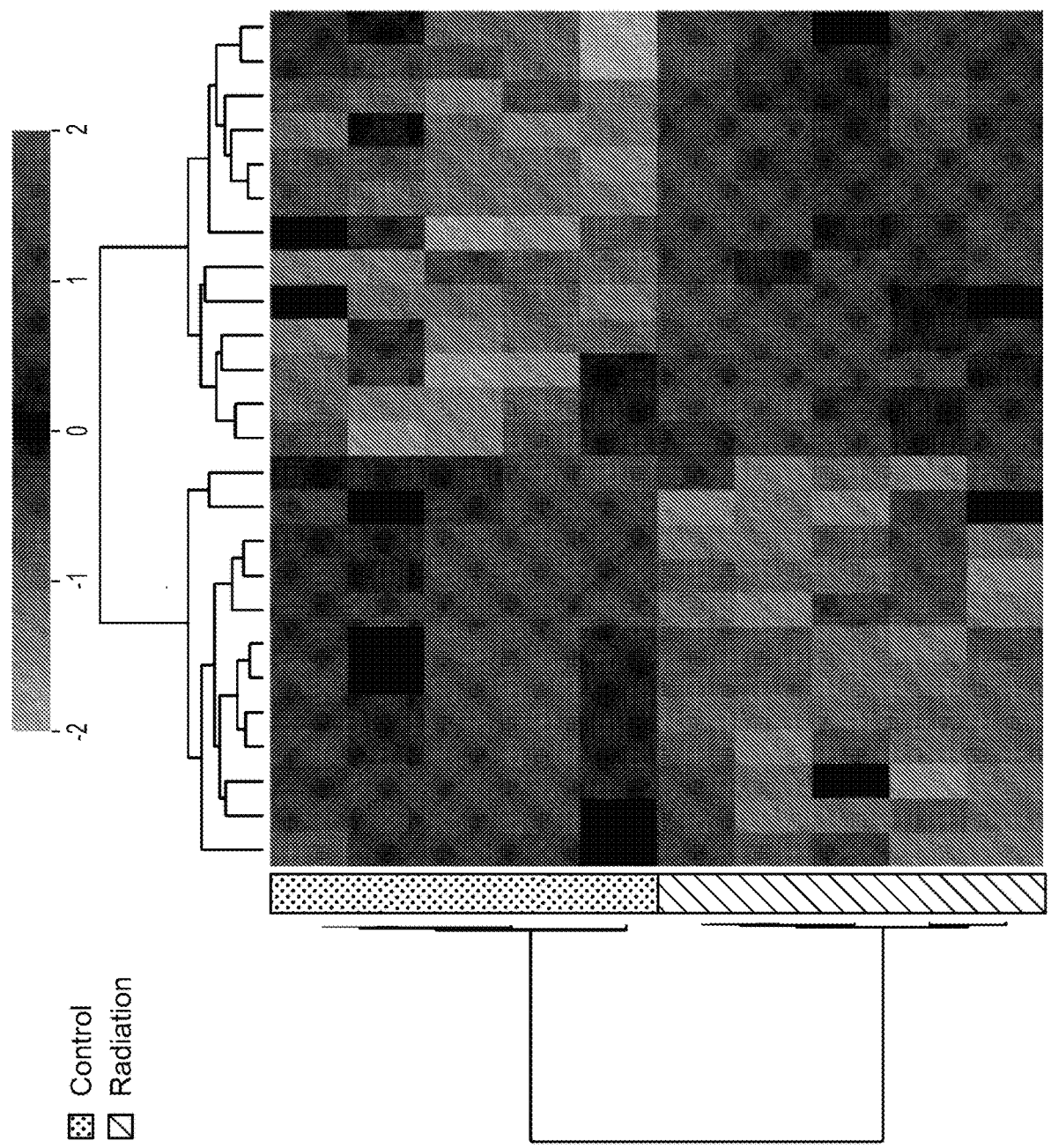
FIG. 5 illustrates a hierarchical cluster analysis of specific fragment CCS values extracted from plasma samples of control versus radiation treated mice.

As shown by FIG. 5, specific fragment CCS values of metabolites extracted from plasma samples can be used as biosignature to differentiate between control versus radiation treated mice using a hierarchical cluster analysis of the CCS features that are most altered after radiation exposure. In FIG. 5, no or a small change is represented by a 0 value, illustrated as black in the figure. In FIG. 5 a change in relative abundance (control versus radiated) of matched product ions (same CCS values same m/z) is illustrated by both the color and intensity of the color (gray=control, white=radiated) for each pixel. It is noted that the top left and bottom right quadrants of FIG. 5 appear to indicate greater change in the control direction, whereas the bottom left and top right quadrants appear to indicate greater change in the radiation direction. Samples were analyzed with a UHPLC instrument coupled with a Mass Spectrometer (Synapt-G2Si HDMS available from Waters Corporation, Milford Mass.) using a modification of a previously reported method [see Paglia et al., Anal Chem. 2015 Jan. 20; 87(2): 1137-44. Briefly, in order to generate fragments, the cone (from 1 to 4) and capillary voltages (from 5 to 50 V) were increased and/or the collision energy was ramped in the trap cell (from 5 to 40 eV), which is located before the ion mobility cell, calculating CCS values for all the fragments. Alternating low (5 eV) and high collision energy (ramping 20-40 eV) allowed data independent acquisition of CCS values for both precursors and fragments ions.

UHPLC conditions were as follows: Mobile phase A: 10 mM ammonium formate with 0.1% formic acid in 40:60 (v/v) acetonitrile/water; Mobile phase B: 10 mM ammonium formate with 0.1% formic acid in 10:90 (v/v. acetonitrile/isopropanol; Column temperature at 55° C., the flow rate at 0.4 mL/min, the injection volume at 5 µL, and the autosampler temperature at 10° C. Initial conditions started with 40% B and immediately a linear gradient from 40% to 43% B in 2 min. In the following 0.1 min, the percentage of mobile phase B was increased to 50%. Over the next 9.9 minutes, the gradient was further ramped to 54% B, and the amount of mobile phase B was increased to 70% in 0.1 min. In the final part of the gradient, the % B was increased to 99% in 5.9 min. The eluent composition returned to the initial conditions in 0.1 min, and the column was equilibrated, at the initial conditions, for 1.9 min before the next injection. The total run time was 20.0 min.

Figure 6:
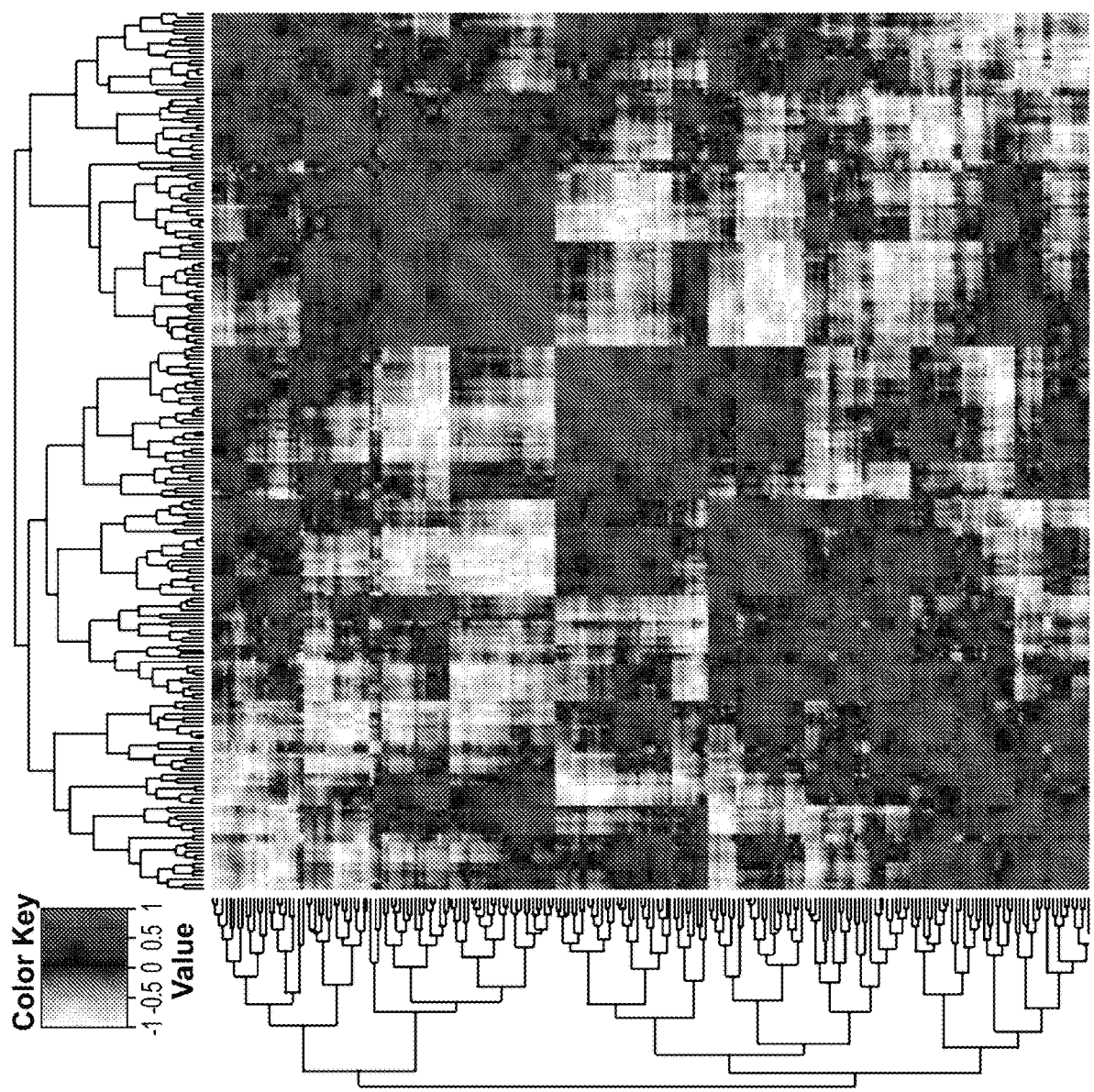
FIG. 6 illustrates a hierarchical cluster analysis of untargeted CCS values from plasma samples of control versus radiation treated mice.

Alternatively, the CCS and/or the m/z of precursor ions can be associated with CCS of product ions. Product ions are generated by disassociation of a parent precursor, each; precursor or product ion with its own m/z. Provided two channels of data are collected; one where the precursor ions are separated by IMS then disassociated and a second where precursor ions are disassociated and their corresponding product ions are separated by IMS, a highly specific "hash mass" can be generated. A hash mass is a composite value consisting of a precursor m/z*its CCSA2*the product ion m/z*its CCSA2. Any combination or mathematical manipulation of the four attributes can be utilized to increase the specificity of a targeted identification. Often in a given MS spectrum two different precursor ions of the same m/z (within the resolving power of the instrument) but different CCSA2 values will be present, similarly two different precursor ions of the same hydrophobicity but different m/z will produce a fragment ion of similar m/z (within the resolving power of the instrument) fragment ion but different CCSA2. The use of the hash tag can significant increase the selectivity of the identification. FIG. 6 shows a hierarchical cluster analysis of untargeted CCS values from plasma samples of control versus radiation treated mice. Precursor or fragment CCS or a combination of the two can be used. Samples were analyzed with a UHPLC instrument coupled with a Mass Spectrometer (Synapt-G2Si HDMS available from Waters Corporation, Milford Mass.) as reported above. In this figure, the color key indicates the relative change for control versus radiation treated samples. The absence of change or small change in signal is represented by a value of 0 (and appears as black in the image). A change in relative abundance (control versus radiated) of matched hash masses (CCS times m/z) is illustrated by both the color and intensity of the color (grey=control, white=radiated) for each pixel. The scale of −1 to 1 represents not an absolute change in abundance, but a scale the brightest color the values (1, −1) being the extremes.

Figure 7:
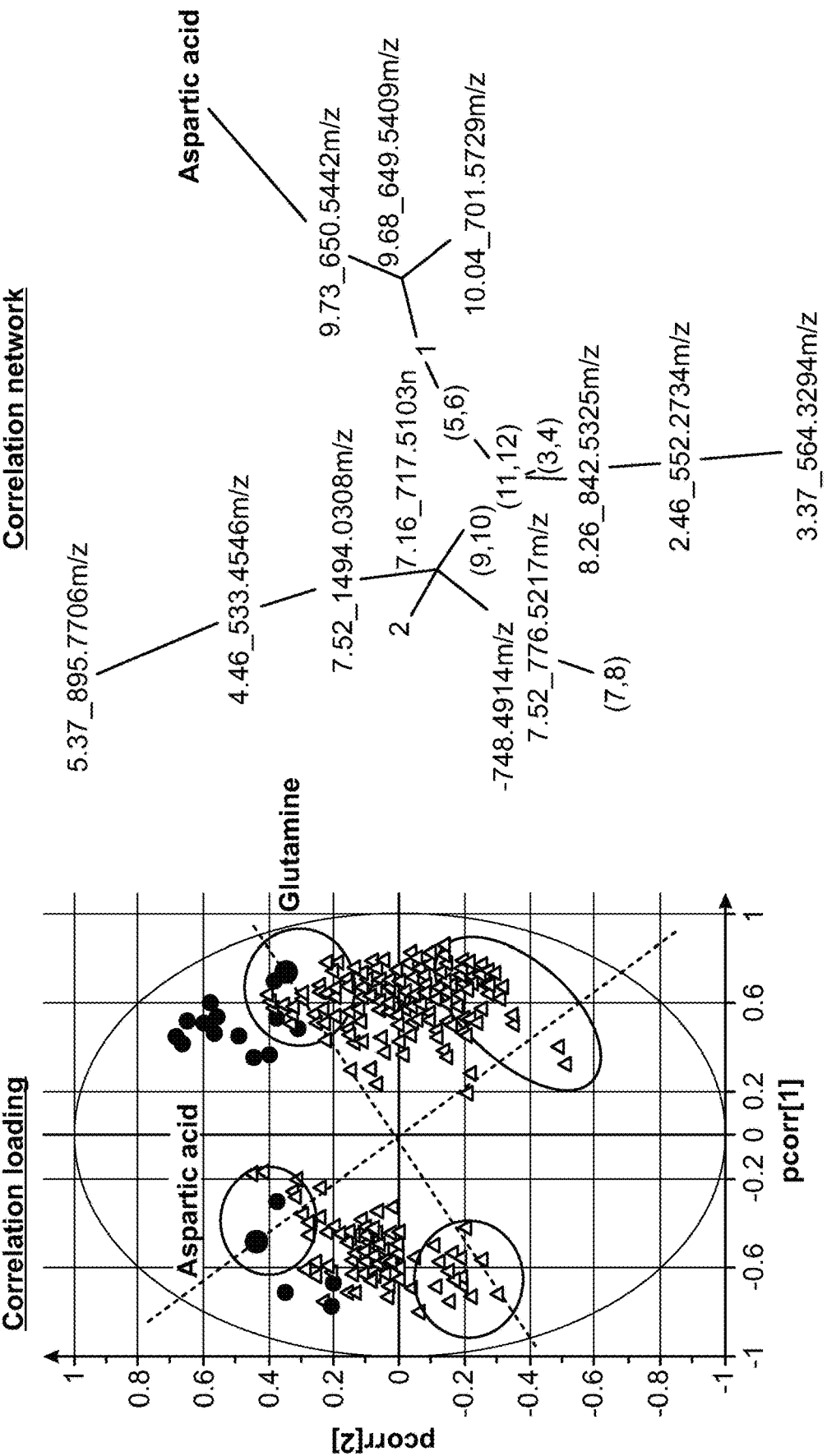
FIG. 7 illustrates a correlation molecular network analysis of precursor/fragment CCS, RT values extracted from human brain samples of healthy controls versus subjects with Alzheimer's disease.

FIG. 7 shows a correlation molecular network analysis of precursor/fragment CCS, RT values extracted from human brain samples of healthy control subjects versus subjects with Alzheimer's disease (n=20 per group). This analysis highlights the power of this approach to identify networks of coregulated chemical classed based on the fragments' CCS values. Samples were analyzed with a UHPLC instrument coupled with a Mass Spectrometer (Synapt-G2Si HDMS available from Waters Corporation, Milford Mass.). The UHPLC-MS acquisition was performed using a modification of a previously reported method (see Anal Chem; 2014 Apr. 15; 86(8):3985-93). Briefly, in order to generate fragments the cone (from 1 to 4) and capillary voltages (from 5 to 50 V) were increased and/or the collision energy was ramped in the trap cell (from 5 to 40 eV), which is located before the ion mobility cell, calculating CCS values for all the fragments. Alternating low (5 eV) and high collision energy (ramping 20-40 eV) allowed data independent acquisition of CCS values for both precursors and fragments ions.

UHPLC Conditions. Mobile phase A: acetonitrile with 0.1% formic acid in acetonitrile/water 40:60 (vol/vol). Mobile phase B: water with 0.1% formic acid in acetonitrile/isopropanol 10:90 (vol/vol). Column 2.1×150 mm) ACQUITY amide column, particle size 1.7 μm. Column temperature at 45° C., the flow rate at 0.4 mL/min, the injection volume at 5 μL, and the autosampler temperature at 4° C. Gradient conditions are as follows:

| Timing (min) | % A |
|---|---|
| 0 | 99 |
| 6 | 40 |
| 10 | 10 |

Figure 8:
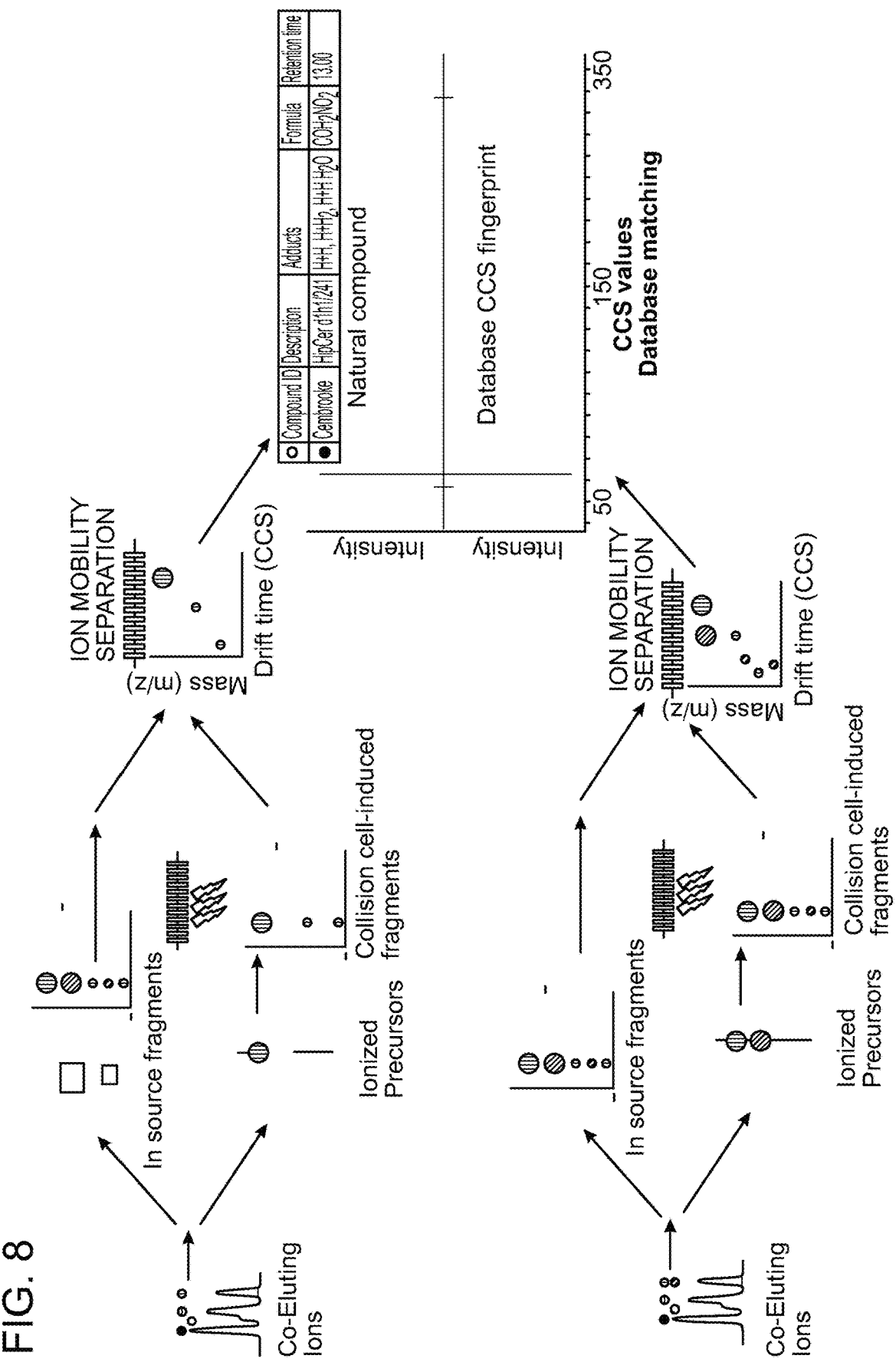
FIG. 8 depicts mirror CCS fingerprint matching for a lipid after fragmentation induces either in-source or in a collision cell.

As shown in FIG. 8 mirror CCS fingerprint matching for a lipid after fragmentation induced either in-source or in a collision cell was performed. This generated an array of product ions each associated with a CCS value. Pure chemicals can be used to build a database of fragments' CCS values which can then be matched against complex samples. Samples were analyzed with a UHPLC instrument coupled with a Mass Spectrometer (Synapt-G2Si HDMS available from Waters Corporation, Milford Mass.)

Computationally predicted CCSs can also be performed. In cases where mass measurements are not able to differentiate between potential candidate metabolites obtained from a database search, a comparison between the experimental and theoretical CCS values can support the identification process. Table 2 shows CCS of fragments as measured by experimental condition or computationally predicted.

TABLE 2

| Fragment | m/z | Ion | Experimental CCS | Predicted CCS |
|---|---|---|---|---|
| Phosphorylcholine | 183.07 | $[M + H]^+$ | 135 | 138 |
| AMP | 347.06 | $[M + H]^+$ | 168 | 193 |
| Glucose | 180.06 | $[M + Na]^+$ | 138 | 134 |
| IMP | 348.05 | $[M + H]^+$ | 168 | 170 |
| GMP | 363.06 | $[M + H]^+$ | 177 | 183 |
| Adenosine | 267.1 | $[M + H]^+$ | 152 | 168 |

Table 3 shows representative fragments for lipids species of phosphatidylcholines (PC), corresponding to lyso-phosphatidylcholines (LPC). CCS values for LPC species are listed in Table 1.

TABLE 3

| Isomers | PC 38:6 (ESI pos) | sn-1 acyl loss | sn-2 acyl loss |
|---|---|---|---|
| 18:2/20:4 | 806.5695 | 544.3398 | 520.3398 |
| 18:1/20:5 | 806.5695 | 542.3241 | 522.3554 |
| 16:0/22:6 | 806.5695 | 568.3398 | 496.3398 |
| 16:1/22:5 | 806.5695 | 570.3554 | 494.3241 |

Table 4 shows representative fragments for lipids species of phosphatidylethanolamines (PE), corresponding to lyso-phosphatidylethanolamines (LPE). CCS values for LPE species are listed in Table 1.

TABLE 4

| Isomers | PE 40:6 (ESI neg) | sn-1 acyl | sn-2 acyl |
|---|---|---|---|
| 20:1/20:5 | 790.539 | 309.28 | 301.217 |
| 18:1/22:5 | 790.539 | 281.249 | 329.249 |
| 18:0/22:6 | 790.539 | 283.2643 | 327.233 |

The invention claimed is:
1. A method of using information obtained from collision cross-section (CCS) of fragment ion values to determine at least one chemical class composition of a sample, the method comprising:
fragmenting the sample to generate a series of product ions, wherein the sample is a complex sample comprising at least two chemical class compositions and including a biofluid, tissue section or a cell culture;

separating the product ions using ion-mobility mass spectrometry;

obtaining CCS values of the product ions;

matching or correlating the CCS values of the product ions to pre-determined values; and using information obtained from the CCS values of the product ions to determine at least one chemical class composition of the sample.

2. The method of claim 1, wherein the ion mobility mass spectrometry comprises the step of performing drift-tube ion mobility spectrometry, travelling-wave ion mobility spectrometry, or differential mobility spectrometry.

3. The method of claim 1, wherein the ion mobility-mass spectrometry is operated in a data independent acquisition mode or data-dependent acquisition, or a combination thereof, wherein CCS of sample precursor ions are associated with CCS of product ions.

4. The method of claim 1, wherein the sample is fragmented in source.

5. The method of claim 1, wherein fragmentation is induced by tandem mass spectrometry (MS/MS), including collision induced dissociation (CID), electron transfer dissociation (ETD), electron impact, ultraviolet photoionization, ozonolysis, or similar fragmentation tools.

6. The method of claim 1, wherein the ionization method is selected from electrospray ionization (ESI), matrix assisted laser desorption ionization (MALDI) or ambient ionization tools, including laser ablation electrospray ionization (LAESI), desorption electrospray ionization (DESI), and rapid evaporative ionization mass spectrometry (REIMS).

7. The method of claim 1, the method further comprising the step of separating the chemical classes prior to the separation of the product ions.

8. The method of claim 1, the method further comprising the step of separating the chemical classes using chromatography prior to the separation of the product ions.

9. The method of claim 1, the method further comprising the step of separating the chemical classes using ion mobility prior to the separation of the product ions.

10. The method of claim 1, the method further comprising the step of separating the chemical classes prior to the separation of the product ions using liquid chromatography, supercritical fluid chromatography or gas chromatography.

11. The method of claim 1, further comprising obtaining at least one ion property selected from m/z ratio, elution position, intensity distribution, charge, and CCS value of sample precursor ions; obtaining at least one ion property selected from m/z ratio, elution position, intensity distribution, and charge of the product ions; correlating the at least one ion property of the precursor ions with the corresponding at least one ion property of the parent ions; and matching or correlating the at least one ion property of both the precursor and parent ions to pre-determined values.

12. The method of claim 1, wherein the sample is a tissue section or a cell culture.

13. The method of claim 1, further comprising
separating sample precursor ions by ion mobility mass spectrometry, fragmenting the precursor ions, and obtaining CCS values of the precursor ions; and
calculating a hash mass comprising a composite value consisting of the precursor ion value m/z, the product ion value m/z, the precursor ion CCS value, and the product ion CCS value.

14. The method of claim 13, wherein a first data channel is collected based on separating the precursor ions by ion mobility mass spectrometry, fragmenting the precursor ions, and obtaining CCS values of the precursor ions, and a second data channel is collected based on fragmenting the precursor ions, separating the precursor and product ions by ion mobility mass spectrometry, and obtaining CCS values of the product ions.

15. The method of claim 14, wherein the first data channel and the second data channel are collecting data simultaneously.

* * * * *